(12) United States Patent
Kim et al.

(10) Patent No.: US 8,771,862 B2
(45) Date of Patent: Jul. 8, 2014

(54) BATTERY PACK AND BATTERY MODULE CONTAINING SAME

(71) Applicants: Samsung SDI Co., Ltd., Yongin-si (KR); Robert Bosch GmbH, Stuttgart (DE)

(72) Inventors: Myung-Chul Kim, Yongin-si (KR); Tae-Yong Kim, Yongin-si (KR); Hyun-Ye Lee, Yongin-si (KR); Shi-Dong Park, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/953,046

(22) Filed: Jul. 29, 2013

(65) Prior Publication Data
US 2013/0309552 A1 Nov. 21, 2013

Related U.S. Application Data

(60) Continuation of application No. 13/775,653, filed on Feb. 25, 2013, now Pat. No. 8,501,347, which is a division of application No. 12/801,765, filed on Jun. 24, 2010, now Pat. No. 8,399,128.

(30) Foreign Application Priority Data

Oct. 30, 2009 (KR) ........................ 10-2009-0104311

(51) Int. Cl.
*H01M 2/26* (2006.01)
*H01M 2/30* (2006.01)

(52) U.S. Cl.
USPC ........... 429/158; 429/159; 429/178; 429/211; 439/627

(58) Field of Classification Search
USPC .......................................... 429/211; 439/627
See application file for complete search history.

(56) References Cited

U.S. PATENT DOCUMENTS

| | | | |
|---|---|---|---|
| 6,097,173 A | 8/2000 | Bryant, Jr. | |
| 6,261,719 B1 | 7/2001 | Ikeda et al. | |
| 6,270,378 B1 | 8/2001 | Lee | |
| 7,736,188 B2 | 6/2010 | Bang et al. | |
| 8,313,855 B2 | 11/2012 | Muis | |
| 8,399,128 B2 * | 3/2013 | Kim et al. | 429/211 |
| 8,501,347 B2 * | 8/2013 | Kim et al. | 429/211 |
| 2003/0091896 A1 * | 5/2003 | Watanabe et al. | 429/158 |
| 2011/0287299 A1 | 11/2011 | Kim | |

FOREIGN PATENT DOCUMENTS

| | | |
|---|---|---|
| JP | 2002-164034 A | 6/2002 |
| KR | 10 2007-0080871 A | 8/2007 |
| KR | 10 2009-0000301 A | 1/2009 |

* cited by examiner

*Primary Examiner* — John S Maples
(74) *Attorney, Agent, or Firm* — Lee & Morse, P.C.

(57) ABSTRACT

A bus bar holder for connecting electrode terminals of a plurality of batteries arranged in a lengthwise direction, the bus bar holder including a bus bar holder plate having an opening in a lengthwise direction thereof and configured such that at least some electrode terminals of the plurality of batteries are extendable through the opening and slidable along the opening; and a bus bar for electrically connecting at least two electrode terminals of adjacent batteries, wherein the bus bar holder plate includes a settling groove in which the bus bar is settled, and the bus bar attached to the electrode terminals is slidable when the electrode terminal slides along the opening.

20 Claims, 12 Drawing Sheets

BATTERY PACK AND BATTERY MODULE CONTAINING SAME

CROSS REFERENCE TO RELATED APPLICATION

This is a continuation application based on application Ser. No. 13/775,653, filed Feb. 25, 2013, now U.S. Pat. No. 8,501,347, which in turn is a divisional application based on application Ser. No. 12/801,765, filed Jun. 24, 2010, now U.S. Pat. No. 8,399,128 B2, issued Mar. 19, 2013, the entire contents of both of which are hereby incorporated by reference.

Korean Patent Application No. 10-2009-0104311, filed on Oct. 30, 2009, in the Korean Intellectual Property Office, and entitled: "Bus Bar Holder," is incorporated by reference herein in its entirety.

BACKGROUND

1. Field

Embodiments relate to a bus bar holder.

2. Description of the Related Art

Due to the increased use of gasoline vehicles, vehicle exhaust gases, which include various harmful substances e.g., nitrogen oxides, carbon monoxide due to incomplete combustion, hydrocarbon, etc., have created a very serious pollution problem. Furthermore, due to the steady depletion of fossil fuels, much research has been conducted on the development of next-generation energy sources and electric-powered vehicles. In this regard, traveling distances of an electric-powered vehicle depend on the performance of its battery. A battery may not be able to supply enough electric energy to guarantee that an electric-powered vehicle travels a sufficient distance. In the case of a vehicle that uses a fossil fuel, e.g., gasoline, light oil, or gas, the vehicle may be quickly resupplied with fuel at a gas station. However, in the case of an electric-powered vehicle, a significant amount of time may be required to recharge a battery, even if recharge stations are established. The time elapsed for charging a battery is a problem that has to be solved for commercialization of electric-powered vehicles. Therefore, improvement of battery performance is considered as the most important issue in relation to the development of electric-powered vehicles.

SUMMARY

Embodiments are directed to a bus bar holder, which represents advances over the related art.

It is a feature of an embodiment to provide a bus bar holder having improved connectivity with respect to electrodes of a battery having predetermined tolerances.

At least one of the above and other features and advantages may be realized by providing a bus bar holder for connecting electrode terminals of a plurality of batteries arranged in a lengthwise direction, the bus bar holder including a bus bar holder plate having an opening in a lengthwise direction thereof and configured such that at least some electrode terminals of the plurality of batteries are extendable through the opening and slidable along the opening; and a bus bar for electrically connecting at least two electrode terminals of adjacent batteries, wherein the bus bar holder plate includes a settling groove in which the bus bar is settled, and the bus bar attached to the electrode terminals is slidable when the electrode terminal slides along the opening.

The opening may be a single opening through which the electrode terminals are extendable through and slidable along the opening.

The opening may be configured to correspond to the electrode terminals, the opening having a predetermined length, for slidability of an electrode terminal, and the length of the opening being proportional to a distance from a reference point to the opening.

The opening may have a length proportional to a summed value of tolerances of the batteries.

The settling groove may extend in the lengthwise direction of the bus bar holder plate and may correspond to the opening.

The bus bar holder plate may include an insulator, and the bus bar may include holes through which the electrode terminals extend.

At least one of the above and other features and advantages may also be realized by providing a bus bar holder for connecting electrode terminals of a plurality of batteries arranged in a lengthwise direction, the bus bar holder including bus bars for electrically connecting at least two electrode terminals of the plurality of batteries; a plurality of unit bus bar holders, the unit bus bar holders being between the bus bars and the batteries, having holes through which the electrode terminals are extendable to be attached to the bus bars, and having settling grooves in which the bus bars are settled; and a bus bar holder plate including an opening in which the plurality of unit bus bar holders are slidable in a lengthwise direction along sliding grooves, the sliding grooves being disposed in inner surfaces of the bus bar holder plate.

The opening of the bus bar holder plate may have a length sufficient for the plurality of unit bus bar holders to slide.

The bus bar holder may further include elastic members interposed between adjacent unit bus bar holders.

At least one of the above and other features and advantages may also be realized by providing a bus bar holder for connecting electrode terminals of a plurality of batteries arranged in a lengthwise direction, the bus bar holder including bus bars for electrically connecting at least two adjacent electrode terminals of the plurality of batteries; a plurality of unit bus bar holders, the unit bus bar holders being between the bus bars and the batteries, including holes through which the electrode terminals are extendable for attaching to the bus bars, and including settling grooves in which the bus bars are settled; and a length adjuster interposed between adjacent the unit bus bar holders.

The length adjuster may have an elastic bellows structure.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
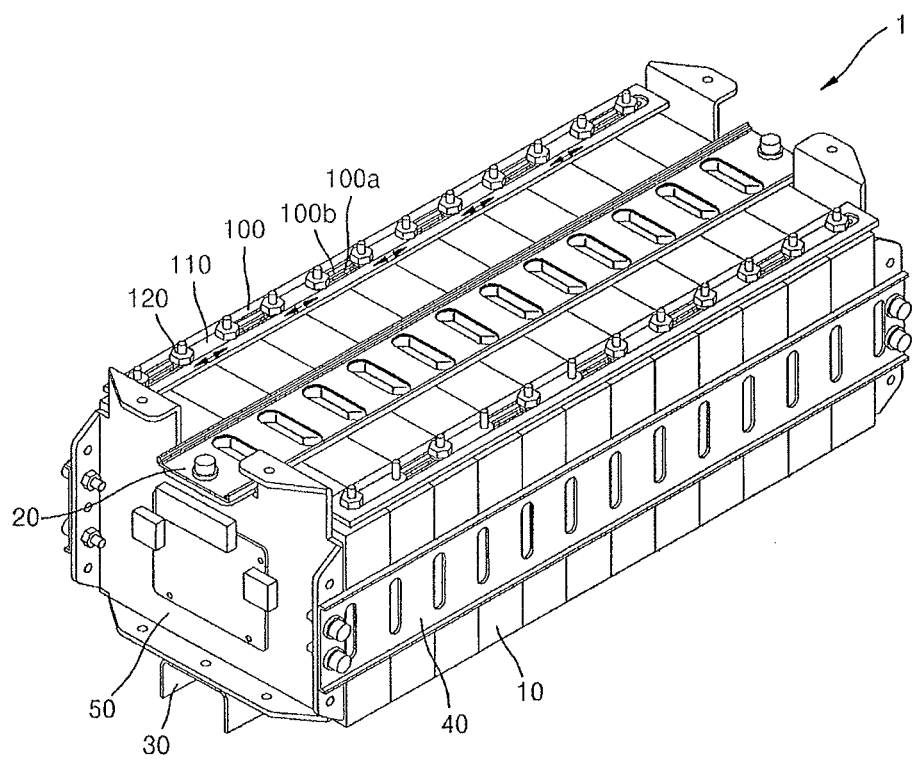
FIG. 1 illustrates a perspective view of a bus bar holder attached to a battery module according to an embodiment.

Korean Patent Application No. 10-2009-0104311, filed on Oct. 30, 2009, in the Korean Intellectual Property Office, and entitled: "Bus bar Holder," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
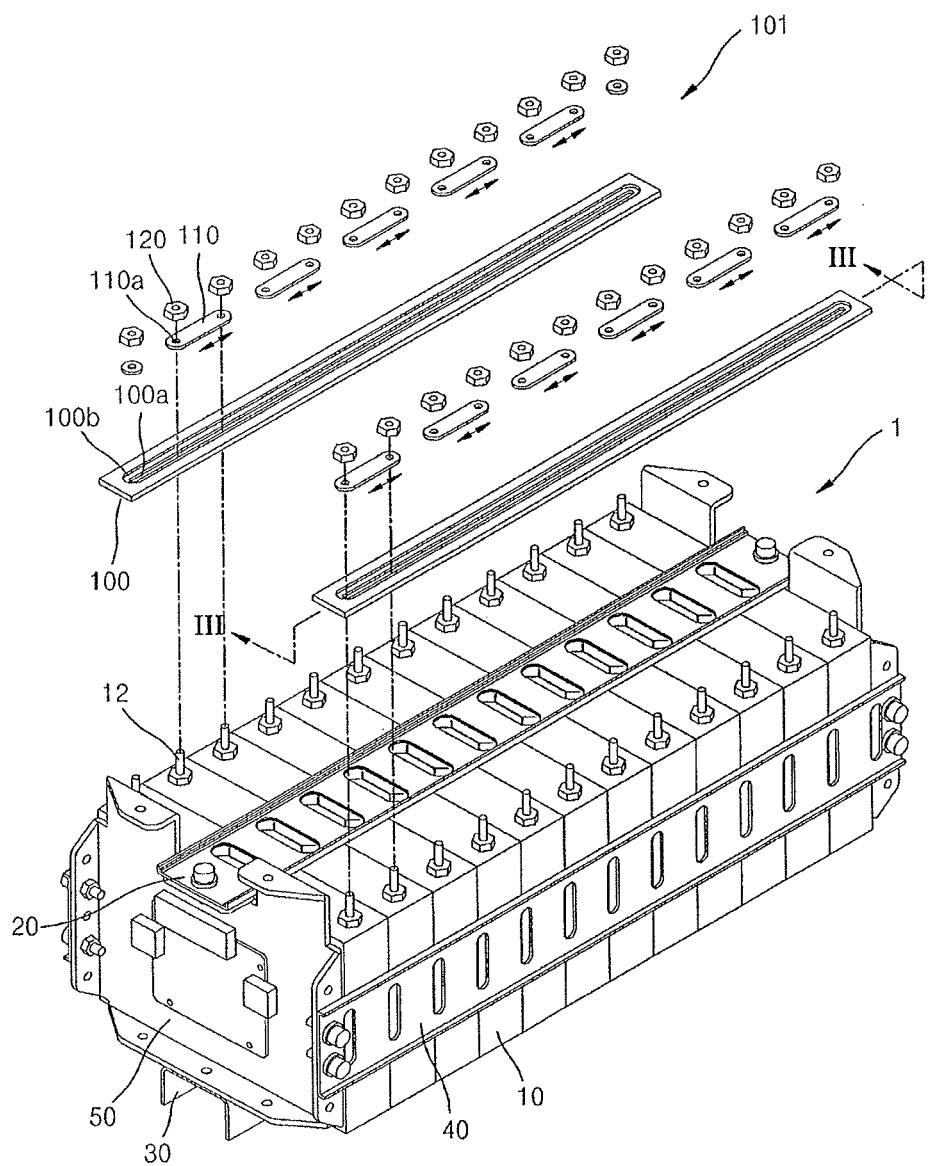
FIG. 2 illustrates an exploded perspective view of the structure shown in FIG. 1.
Figure 3:
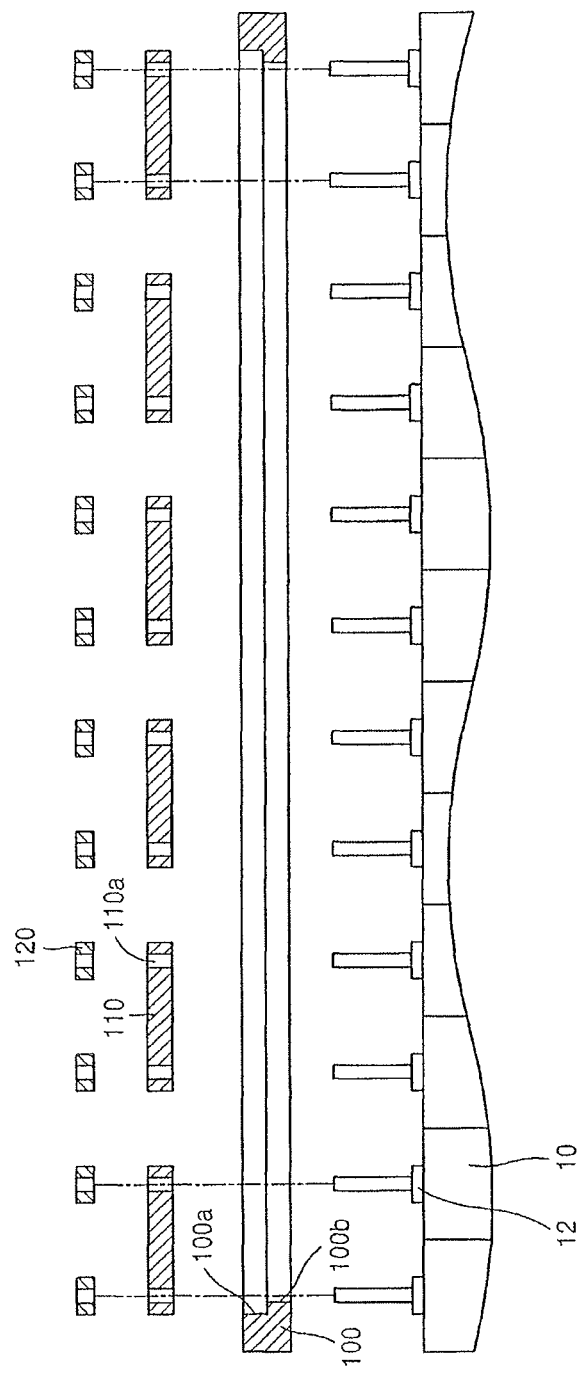
FIG. 3 illustrates a sectional view taken along a line of FIG. 2.

Referring to FIGS. 1 through 3, a bus bar holder 101 according to an embodiment will be described below. FIG. 1 illustrates a perspective view of the bus bar holder 101 attached to a battery module 1 according to an embodiment. FIG. 2 illustrates an exploded perspective view of the structure shown in FIG. 1. FIG. 3 illustrates a sectional view taken along a line III-III' of FIG. 2. The bus bar holder 101 may be interposed between bus bars 110 and the battery module 1.

The battery module 1 may include a plurality of batteries 10, a top plate 20, a bottom plate 30, side plates 40, and end plates 50. The batteries 10 may be various types of batteries, e.g., primary batteries or secondary batteries. For convenience of explanation, it is assumed below that the batteries 10 are secondary batteries, e.g., lithium secondary batteries. However, the batteries 10 may be other types of secondary batteries.

The secondary battery 10 may include an electrode assembly (not shown) and an electrode terminal 12. The electrode assembly may include a negative electrode (not shown), a separator (not shown), and a positive electrode (not shown), and may have a wound structure or stacked structure. The electrode assembly may be housed in the secondary battery 10 and the electrode terminal 12 may be used for electrical connection to an external device. The secondary batteries 10 may be arranged next to each other in a predetermined direction and may be electrically connected to each other in parallel or in series. When connected in series, the secondary batteries 10 may be arranged so that the negative electrode of one secondary battery 10 contacts the positive electrode of an adjacent secondary battery 10. The electrode terminals 12 of the secondary batteries 10 may be connected to each other via the bus bars 110.

In the secondary battery 10, the electrode assembly may expand or contract during charging and discharging. The expansion and contraction of the electrode assembly may act as a physical force on the secondary battery 10. Thus, a sealing assembly accommodating the electrode assembly may physically expand or contract according to the physical deformations of the electrode assembly. Due to repeated expansions and contractions, the secondary battery 10 may be permanently deformed; and an increase in volume of the secondary battery 10 may increase the electrical resistance thereof. Thus, the efficiency of the secondary battery 10 may be deteriorated. Therefore, the end plates 50 may be arranged at both ends of the plurality of second batteries 10; and the side plates 40 may be connected to the side ends of the end plates 50 to firmly fix the plurality of secondary batteries 10, to prevent the plurality of secondary batteries 10 from expanding/contracting in the lengthwise direction.

The top plate 20 may be disposed on top of the plurality of secondary batteries 10 and may be connected to the top ends of the end plates 50. The bottom plate 30 may be disposed below the plurality of secondary batteries 10 to support the secondary batteries 10 and may be connected to the bottom end of the end plates 50.

The bus bar 110 may electrically connect at least two electrode terminals 12 of neighboring batteries 10. The bus bar 110 may contain a metal. Holes 110a through which the electrode terminals 12 are to be inserted may be formed in the bus bar 110; and attaching units 120 may correspond to the holes 110a. In other words, the electrode terminals 12 inserted through the holes 110a in the bus bar 110 may be attached to the attaching units 120. Thus, the bus bar 110 and the electrode terminals 12 may be attached to each other. The attaching units 120 may be screws or nuts attached to the electrode terminals 12.

The bus bar holder 101 may be interposed between the bus bar 110 and the electrode terminals 12. The bus bar holder 101 may include an insulation material to prevent a short circuit and may guide attachment of the bus bar 110 so that the bus bar 110 is easily attached to the electrode terminals 12. When the bus bar holder 101 is attached to the electrode terminals 12, if holes were to be disposed evenly apart from each other in the bus bar holder 101, attachment problems may occur due to manufacturing tolerances of the secondary batteries 10. When the secondary batteries 10 are manufactured, if the manufacturing tolerances are high, the manufacturing costs may increase. Furthermore, since the secondary batteries 10 are lithium secondary batteries and the volumes thereof may change during charging and discharging, if the bus bar holder 101 is attached to the electrode terminals 12 through holes disposed evenly apart from each other, a connection problem may occur between the bus bar holder 101 and the electrode terminals 12 when the secondary batteries 10 are charged or discharged.

The bus bar holder 101 of an embodiment may include a bus bar holder plate 100. The bus bar holder plate 100 may include an opening 100a formed in its lengthwise direction so that the electrode terminals 12 of the plurality of batteries 10 may be inserted through the opening 100a. The electrode terminals 12 may slide, i.e., is slidable, along the opening 100a. The opening 100a may be a single opening through which all of the electrode terminals 12 may be inserted. The bus bar holder plate 100 may have a settling groove 100b in which the bus bar 110 may be settled. The bus bar 110 attached to the electrode terminals 12 may slide in the settling groove when the bus bar 110 is fixed to the battery module 1. The electrode terminals 12 may slide along the opening 100a. A first bus bar 110 may be easily attached to the electrode terminals 12 regardless of the volumes of the secondary batteries 10 or manufacturing tolerance of the electrode terminals 12. Furthermore, even if the volumes of the secondary batteries 10 change, other bus bars 110 attached to the electrode terminals 12 may slide along the settling groove 100b. Thus, the bus bar holder 101 may have a structure easily adaptable to volume changes of the secondary batteries 10.

Figure 4:
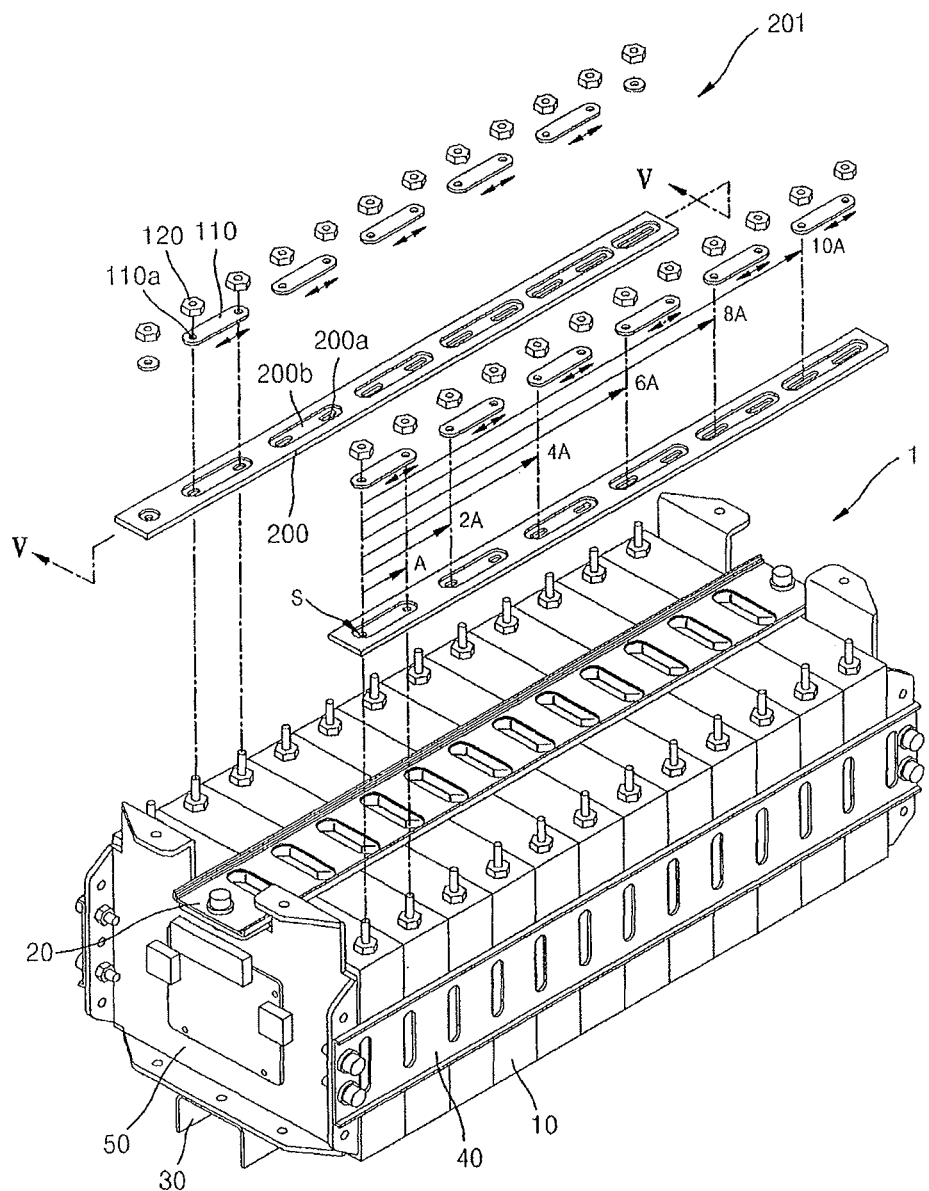
FIG. 4 illustrates an exploded perspective view of a bus bar holder attached to a battery module according to another embodiment.
Figure 5:
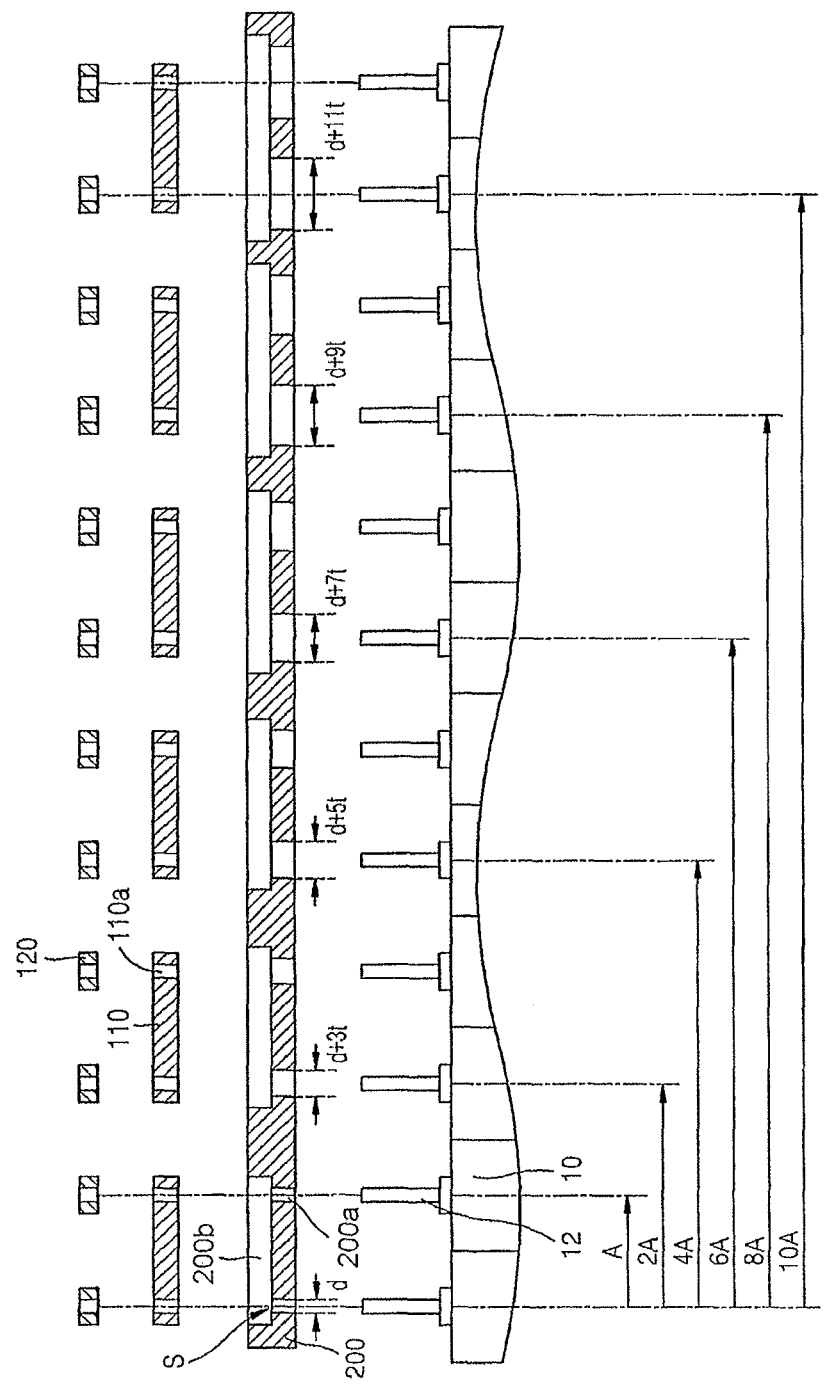
FIG. 5 illustrates a sectional view taken along a line V-V' of FIG. 4.

Referring to FIGS. 4 and 5, a bus bar holder 201 according to another embodiment will be described below. FIG. 4 illustrates an exploded perspective view of the bus bar holder 201 attached to the battery module 1 according to another embodiment. FIG. 5 illustrates a sectional view taken along a line V-V' of FIG. 4. According to the present embodiment, the bus bar holder 201 may include a bus bar holder plate 200. Openings 200a may be formed in the bus bar holder plate 200 in the lengthwise direction. First electrode terminals 12 of the plurality of secondary batteries 10 may be inserted through the openings 200a, and the electrode terminals 12 may slide along the openings 200a. The openings 200a may be formed at locations corresponding to the electrode terminals 12. Furthermore, the openings 200a may have predetermined lengths so that the electrode terminals 12 may slide therein. In particular, the predetermined lengths may be proportional to a distance from a reference point S to the openings 200a. The length of the openings 200a may extend in correspondence to a sum of manufacturing tolerances t of the bus bar holder 201 as a distance A from the reference point S to the openings 200a increases. The sum of the manufacturing tolerances t of the bus bar holder 201 indicates a value of a portion of the lengths of the openings 200a of the bus bar holder plate 200 that extends in correspondence to the sum of manufacturing tolerances of the sizes of the secondary batteries 10 and the locations of the electrode terminals 12. The sum of the manufacturing tolerances t may include dimensional tolerances or geometric tolerances of the secondary batteries 10, the electrode terminals 12, and the bus bar holder plate 200. The manufacturing tolerances t may accumulate as the distance from the reference point S to the openings 200a increases. Therefore, the openings 200a may have lengths extending as much as sums of the diameter d and the accumulated manufacturing tolerances t, which is sufficient for inserting the electrode terminals 12 through the openings 200a. Furthermore, the lengths of the openings 200a may be determined in consideration of not only the manufacturing tolerances t, but also movements of the electrode terminals 12 due to contraction and/or expansion of the secondary batteries 10. Distances between the secondary batteries 10 adjacent to each other may be fixed by the bus bars 110. Thus, the length of openings 200a corresponding to adjacent secondary batteries 10 may be equal. In other words, referring to FIG. 5, the length of the opening 200a, which is two distance units 2A apart from a reference point, and the length of the opening 200a, which is three distance units 3A apart from the reference point, may be d+3t (d indicates the diameter sufficient for inserting the electrode terminals 12 through the openings 200a, and 3t indicates the manufacturing tolerances t summed three times). The lengths of the opening 200a, which is two distance units 2A apart from the reference point, and the opening 200a, which is three distance units 3A apart from the reference point, may both be d+3t, since intervals among the electrode terminals 12 may be evenly maintained by the bus bar 110, the bus bar 110 may move with respect to the greater value between d+2t, which is required at the point with respect to two distance units away from the reference point, and d+3t, which is required at the point with respect to three distance units away from the reference point.

Accordingly, the bus bar holder plate 200 with the openings 200a, which may be formed in consideration of the manufacturing tolerances t, may be easily attached to the electrode terminals 12 of the battery module 1. Furthermore, the bus bar holder 201 may be effectively adapted to compensate for contraction and expansion of the secondary batteries 10.

Settling grooves 200b may be formed in the bus bar holder plate 200 to correspond to the length of the openings 200a. Therefore, when the electrode terminals 12 and the bus bars 110 are attached to each other and slide on the bus bar holder plate 200, the electrode terminals 12 and the bus bars 110 may slide along the settling grooves 200b.

Figure 6:
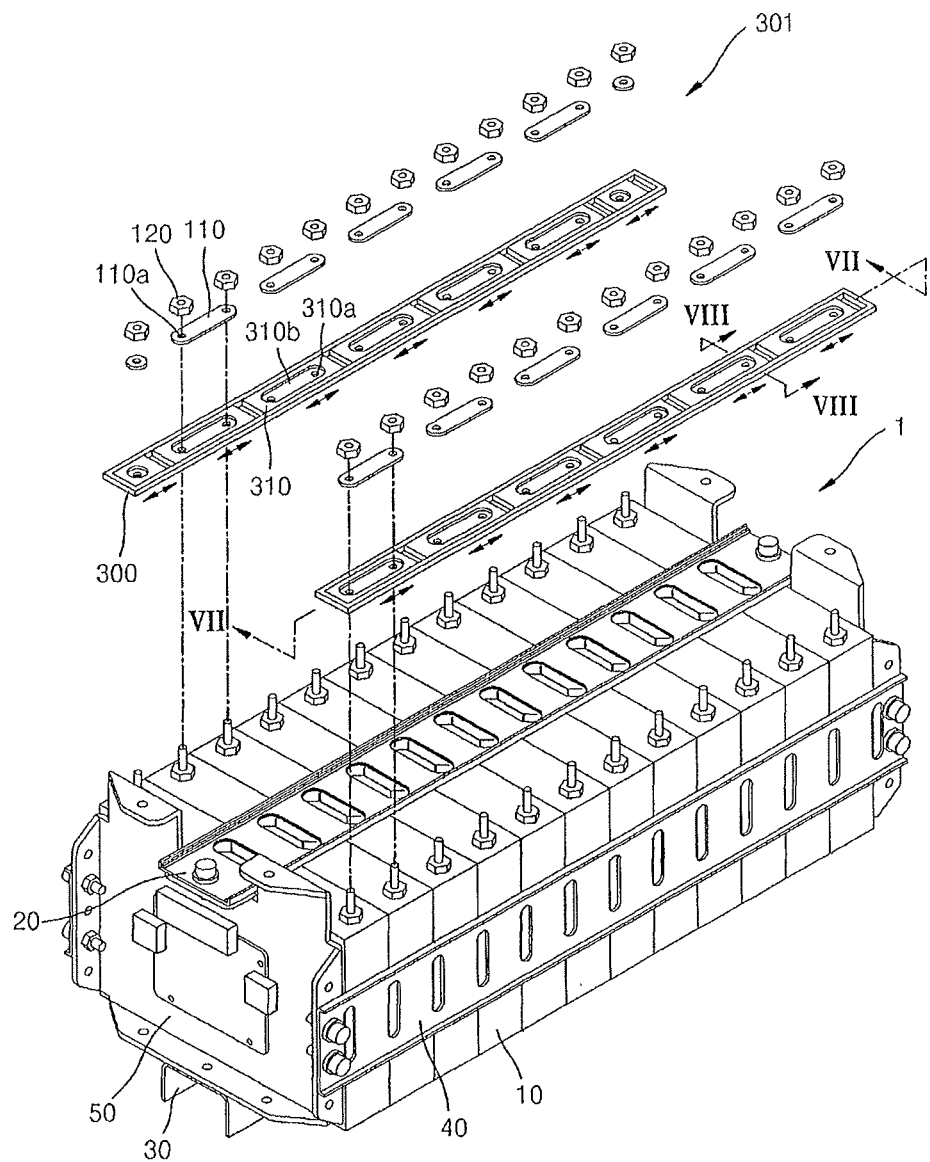
FIG. 6 illustrates an exploded perspective view showing a bus bar holder attached to a battery module according to yet another embodiment.
Figure 7:
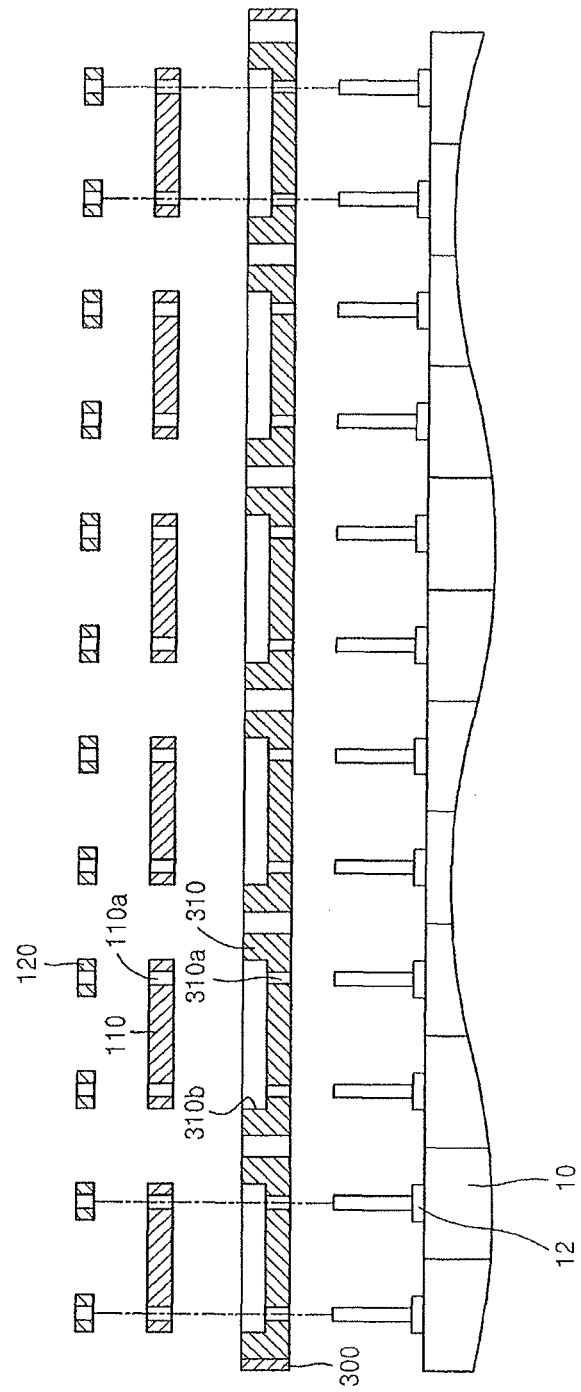
FIG. 7 illustrates a sectional view taken along a line VII-VII' of FIG. 6.
Figure 8:
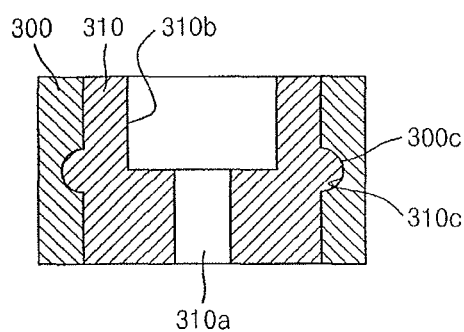
FIG. 8 illustrates a sectional view taken along a line VIII-VIII' of FIG. 6.

Referring to FIGS. 6 through 8, a bus bar holder 301 according to yet another embodiment will be described below. FIG. 6 illustrates an exploded perspective view of the bus bar holder 301 attached to the battery module 1 according to yet another embodiment. FIG. 7 illustrates a sectional view taken along a line VII-VII' of FIG. 6. FIG. 8 illustrates a sectional view taken along a line VIII-VIII' of FIG. 6.

According to the present embodiment, the bus bar holder 301 may include a bus bar holder plate 300 and a plurality of unit bus bar holders 310.

The unit bus bar holder 310 may be interposed between the bus bar 110 and the secondary battery 10. A holder hole 310a may be formed in the unit bus bar holder 310; and the electrode terminal 12 may be inserted, i.e., may extend, through the holder hole 310a so that the electrode terminals 12 and the bus bars 110 may be attached to each other. A settling groove 310b for receiving the bus bar 110 may be formed in a surface of the unit bus bar holder 310.

Figure 9:
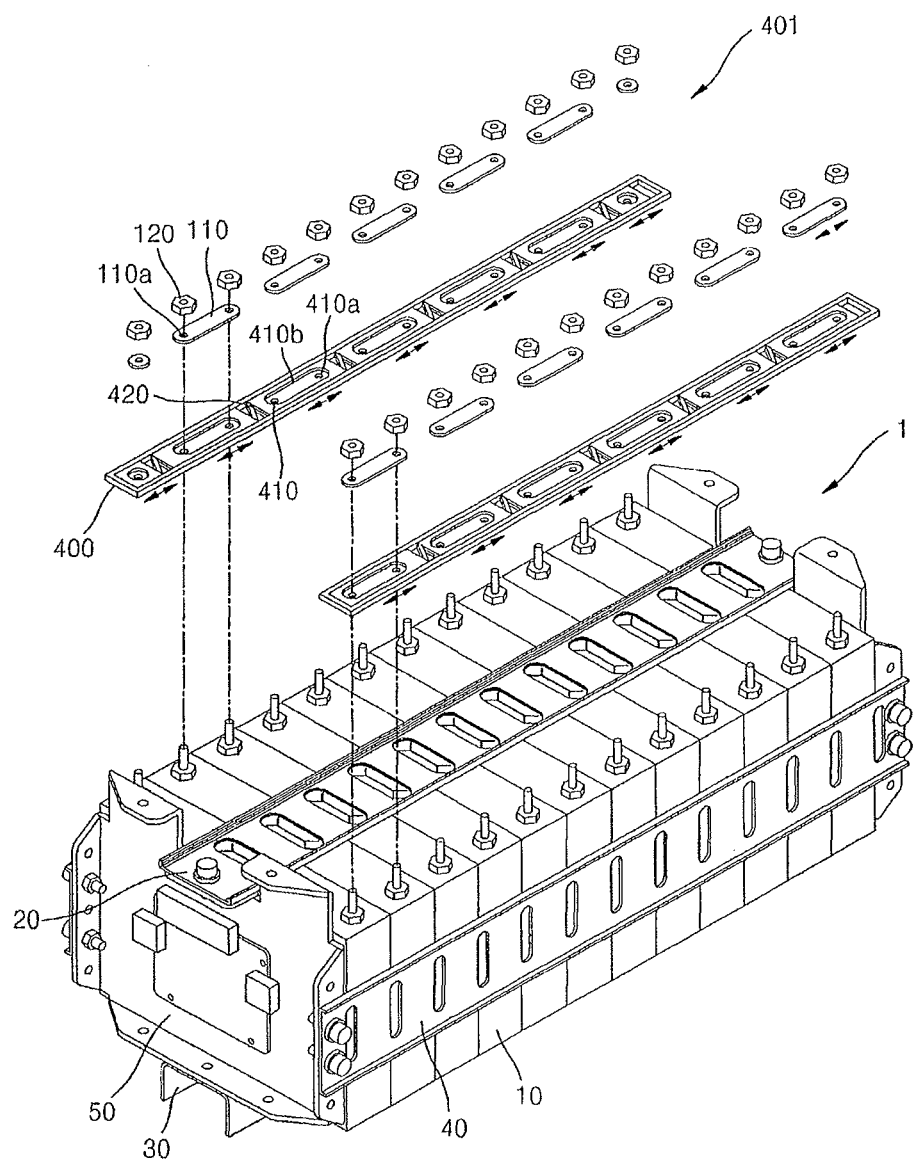
FIG. 9 illustrates a modification of the embodiment shown in FIG. 6.
Figure 10:
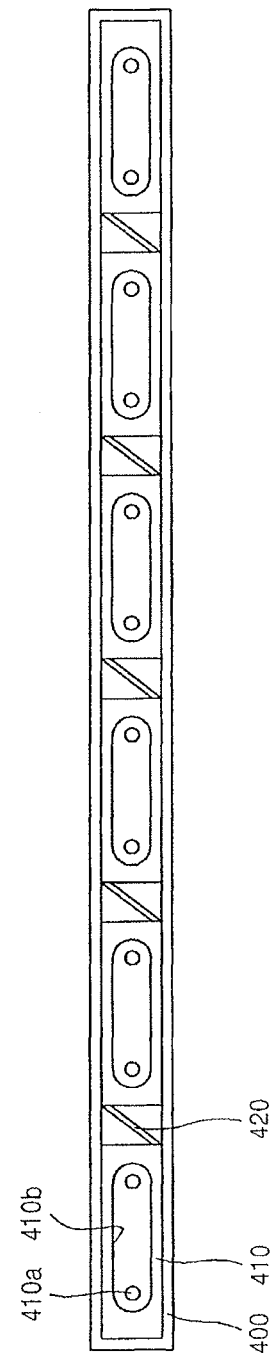
FIG. 10 illustrates a plan view of FIG. 9.

Sliding grooves 300c may be formed in inner surfaces of the bus bar holder plate 300 so that the plurality of unit bus bar holders 310 may slide along the sliding grooves 300c. Grooves 310c corresponding to the sliding groove 300c may be formed in the side surfaces of the bus bar holders 310. Although the sliding grooves 300c may be concave grooves and the corresponding grooves 310c may be convex grooves, as illustrated in FIG. 8, the embodiments are not limited thereto, and various modifications may be made. For example, the unit bus bar holders 310 may include casters, so that the unit bus bar holders 310 may slide on the inner surfaces of the bus bar holder plate 300. Also, openings 300a of the bus bar holder plate 300 may have sizes sufficient for the plurality of unit bus bar holders 310 to slide therein. Therefore, the bus bar holder 301 may be easily adapted to changes in locations of the electrode terminals 12 due to tolerances or deformation of secondary batteries 12 by sliding of the unit bus bar holders 310. FIGS. 9 and 10 illustrate another modification of the embodiment shown in FIG. 6. In particular, FIG. 9 illustrates a modification of the embodiment shown in FIG. 6 and FIG. 10 illustrates a plan view of FIG. 9. According to the modified embodiment illustrated in FIGS. 9 and 10, an elastic member 420 may be further disposed among a plurality of unit bus bar holders 410. Accordingly, the unit bus bar holders 410 may elastically maintain intervals therebetween via the elastic members 420.

Figure 11:
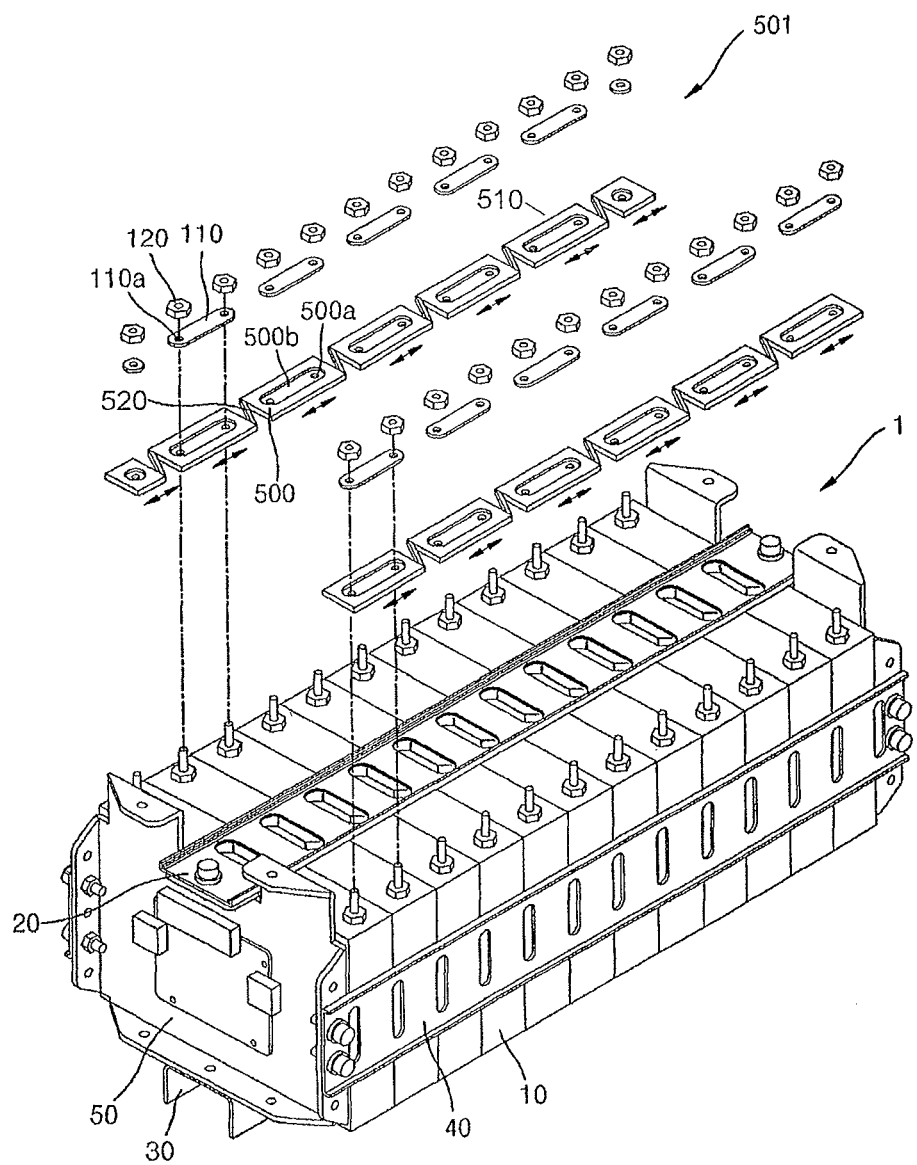
FIG. 11 illustrates an exploded perspective view of a bus bar holder attached to a battery module according to still another embodiment.
Figure 12:
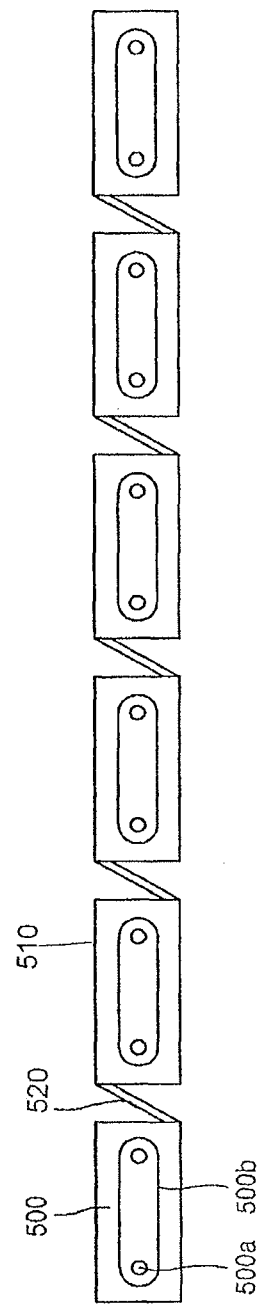
FIG. 12 illustrates a plan view of the bus bar holder shown in FIG. 11.

Referring to FIGS. 11 and 12, a bus bar holder 501 according to still another embodiment will be described below. FIG. 11 illustrates an exploded perspective view of the bus bar holder 501 attached to the battery module 1 according to still another embodiment. FIG. 12 illustrates a plan view of the bus bar holder 501 shown in FIG. 11.

The bus bar holder 501 may include a plurality of unit bus bar holders 510 and length adjusters 520.

The unit bus bar holder 510 may be interposed between the bus bar 110 and the secondary battery 10. A holder hole 500a may be formed in the unit bus bar holder 510; and the electrode terminal 12 may be inserted through holder hole 500a so that the electrode terminals 12 and the bus bars 110 may be attached to each other. A settling groove 500b for accommodating the bus bar 110 may be formed in a surface of the unit bus bar holder 510.

The length adjuster 520 may elastically connect the unit bus bar holders 510 to the adjacent unit bus bar holder 510. For example, as illustrated in FIGS. 11 and 12, the length adjuster 520 may be an elastic object with a bellows structure. Accordingly, the bus bar holder 501 may be easily adapted to changes in length due to manufacturing tolerances as the length adjuster 520 elastically adjusts its length.

In comparison to the bus bar holder 501 illustrated in FIG. 11, the bus bar holder 401 illustrated in FIG. 9 may restrict a sliding range of the electrode terminals 12 along the length of the bus bar holder plate 400 and may also be advantageous due to the bus bar holder plate 400 that guides the unit bus bar holders 410 during sliding.

The bus bar holders 101, 201, 301, 401, and 501 illustrated in FIGS. 1 through 12 may be applied to the battery module 1. In an implementation, the battery module 1 may include twelve secondary batteries 10; and eight battery modules 1 may be stacked to form a battery pack. Such a battery module 1 or a battery pack may be applied to electric-powered vehicles, and it is clear that the bus bar holders 101, 201, 301, 401, and 501 may be applied to the battery module 1 and the battery pack.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
 a plurality of batteries arranged in a first direction, each battery of the plurality of batteries including an electrode terminal thereon;
 a first bus bar electrically connecting at least two adjacent electrode terminals of two of the plurality of batteries;
 a second bus bar electrically connecting another at least two adjacent electrode terminals of two of the plurality of batteries; and
 a bus bar holder accommodating the first and second bus bars in the first direction, the bus bar holder including an inter-bus bar length adjuster between the first bus bar and the second bus bar,
 wherein the inter-bus bar length adjuster includes an opening extending in the first direction and having a length in the first direction greater than a length in a direction perpendicular to the first direction.

2. The battery pack as claimed in claim 1, wherein the plurality of batteries each with the electrode terminal provide a plurality of electrode terminals in the battery pack.

3. The battery pack as claimed in claim 1, wherein the opening is a continuous opening through which the electrode terminals extend through.

4. The battery pack as claimed in claim 3, wherein the continuous opening extends along substantially an entire length of the bus bar holder in the first direction.

5. The battery pack as claimed in claim 1, wherein the bus bar holder includes a settling groove in which the first and second bus bars are settled.

6. The battery pack as claimed in claim 5, wherein the settling groove extends continuously across substantially an entire length of the bus bar holder in the first direction.

7. The battery pack as claimed in claim 1, wherein the bus bar holder includes a first settling groove accommodating the first bus bar and a second settling groove accommodating the second bus bar, the first and second settling grooves each having a length in the first direction longer than a length of the first and second bus bars in the first direction.

8. The battery pack as claimed in claim 7, wherein the second settling groove is longer in the first direction than the first settling groove.

9. The battery pack as claimed in claim 7, wherein the opening includes a plurality of openings in each of the first settling groove and the second settling groove, each opening of the plurality of openings having a length in the first direction longer than a width of each of the electrode terminals.

10. The battery pack as claimed in claim 9, wherein the plurality of openings in the second settling groove are longer in the first direction than the plurality of openings in the first settling groove.

11. The battery pack as claimed in claim 9, wherein the electrode terminals of the batteries extend through respective ones of the plurality of openings, each the plurality of openings having a predetermined length, and the predetermined length of each of the plurality of openings being proportional to a distance from a reference point to each opening.

12. The battery pack as claimed in claim 2, wherein the bus bar holder includes a first unit bus bar holder and a second unit bus bar holder, the first and second unit bus bar holders:
 being between the first bus bar and the batteries and between the second bus bar and the batteries, respectively,
 having holes through which the electrode terminals extend to be attached to the first and second bus bars, and
 having a first settling groove and a second settling groove in which the first bus bar and the second bus bar are respectively settled.

13. The battery pack as claimed in claim 12, wherein:
 the bus bar holder further includes a bus bar holder plate,
 the inter-bus bar length adjuster includes sliding grooves on the bus bar holder plate, and
 the bus bar holder plate includes an opening in which the first and second unit bus bar holders are slidable in the first direction along the sliding grooves.

14. The battery pack as claimed in claim 13, wherein the opening of the bus bar holder plate has a length sufficient for first and second unit bus bar holders to slide.

15. The battery pack as claimed in claim 13, wherein the inter bus bar length adjuster further includes elastic members interposed between adjacent first and second unit bus bar holders.

16. The battery pack as claimed in claim 12, wherein the bus bar holder including the inter-bus bar length adjuster has an elastic bellows structure.

17. The battery pack as claimed in claim 1, wherein the batteries are secondary batteries.

18. The battery pack as claimed in claim 1, wherein the batteries are lithium secondary batteries.

19. A battery module for electric-powered vehicles including the battery pack as claimed in claim 1.

20. A battery pack, comprising:
a plurality of batteries arranged in a first direction, each battery of the plurality of batteries including an electrode terminal thereon;
a first bus bar electrically connecting at least two adjacent electrode terminals of two of the plurality of batteries;
a second bus bar electrically connecting another at least two adjacent electrode terminals of two of the plurality of batteries
a bus bar holder accommodating the first and second bus bars in the first direction, the bus bar holder including an inter-bus bar length adjuster between the first bus bar and the second bus bar,
wherein the plurality of batteries each with the electrode terminal provide a plurality of electrode terminals in the battery pack,
wherein the bus bar holder includes a first unit bus bar holder and a second unit bus bar holder, the first and second unit bus bar holders:
  being between the first bus bar and the batteries and between the second bus bar and the batteries, respectively,
  having holes through which the electrode terminals extend to be attached to the first and second bus bars, and
  having a first settling groove and a second settling groove in which the first bus bar and the second bus bar are respectively settled, and
wherein the bus bar holder including the inter-bus bar length adjuster has an elastic bellows structure.

* * * * *